United States Patent
Sasa

(10) Patent No.: US 11,283,981 B2
(45) Date of Patent: Mar. 22, 2022

(54) IMAGE ACQUISITION DEVICE, IMAGE ACQUISITION METHOD AND INSPECTION APPARATUS

(71) Applicant: SCREEN HOLDINGS CO., LTD., Kyoto (JP)

(72) Inventor: Yasushi Sasa, Kyoto (JP)

(73) Assignee: SCREEN HOLDINGS, CO., LTD., Kyoto (JP)

(*) Notice: Subject to any disclaimer, the term of this patent is extended or adjusted under 35 U.S.C. 154(b) by 0 days.

(21) Appl. No.: 16/962,782

(22) PCT Filed: Nov. 8, 2018

(86) PCT No.: PCT/JP2018/041491
§ 371 (c)(1),
(2) Date: Jul. 16, 2020

(87) PCT Pub. No.: WO2019/150693
PCT Pub. Date: Aug. 8, 2019

(65) Prior Publication Data
US 2020/0358935 A1    Nov. 12, 2020

(30) Foreign Application Priority Data
Feb. 5, 2018   (JP) .............................. JP2018-018125

(51) Int. Cl.
*H04N 5/225*   (2006.01)
*G01N 21/88*   (2006.01)
(Continued)

(52) U.S. Cl.
CPC ....... *H04N 5/2256* (2013.01); *G01N 21/8851* (2013.01); *H04N 5/2625* (2013.01); *H04N 7/18* (2013.01)

(58) Field of Classification Search
CPC ...... H04N 5/2256; H04N 5/2625; H04N 7/18; G01N 21/8851; G01N 21/88; G01N 21/89;
(Continued)

(56) References Cited

U.S. PATENT DOCUMENTS 6,327,374 B1   12/2001   Piironen et al.
7,777,897 B1   8/2010   Gibbons
(Continued)

FOREIGN PATENT DOCUMENTS

EP   2 362 936 B1   10/2012
JP   2001-304835 A   10/2001
(Continued)

OTHER PUBLICATIONS

Taiwanese Office Action issued in corresponding Taiwanese Patent Application No. 107141862, dated Jul. 15, 2019, with English translation.

(Continued)

*Primary Examiner* — Nasim N Nirjhar
(74) *Attorney, Agent, or Firm* — McDermott Will & Emery LLP

(57) ABSTRACT

A mover moves an object in a first direction. A plurality of partial images of the object are obtained by switching N (N is a natural number equal to or greater than 2) light sources while moving the object. An image of the object is obtained by deleting a part according to the switching order of the light sources from a composite image obtained by combining the plurality of partial images for each light source. As a result, as many images of the object illuminated only by one of the N light sources as the N light sources, i.e. N images of the object, are obtained.

9 Claims, 9 Drawing Sheets

(51) Int. Cl.
*H04N 5/262* (2006.01)
*H04N 7/18* (2006.01)

(58) Field of Classification Search
CPC ......... G06T 3/4038; G06T 2207/30164; G06T 2207/10016; G06T 2207/10152; G06T 2207/20021; G06T 2207/20221; G06T 7/001
See application file for complete search history.

(56) References Cited

U.S. PATENT DOCUMENTS

| | | | | |
|---|---|---|---|---|
| 2010/0260378 | A1* | 10/2010 | Noy | G06T 7/12 382/103 |
| 2017/0122878 | A1 | 5/2017 | Ono et al. | |
| 2017/0307544 | A1 | 10/2017 | Nagata | |
| 2018/0031490 | A1* | 2/2018 | Okada | G01N 21/909 |
| 2019/0172190 | A1* | 6/2019 | Liu | H04N 5/247 |

FOREIGN PATENT DOCUMENTS

| | | |
|---|---|---|
| JP | 2003-028805 A | 1/2003 |
| JP | 2006-329919 A | 12/2006 |
| JP | 2012-042297 A | 3/2012 |
| JP | 2013-036796 A | 2/2013 |
| JP | 2014-163771 A | 9/2014 |
| JP | 2015-125089 A | 7/2015 |
| JP | 2015-232485 A | 12/2015 |
| JP | 2016-035405 A | 3/2016 |
| JP | 2016-057075 A | 4/2016 |
| JP | 2017-009533 A | 1/2017 |
| JP | 6580390 B2 * | 9/2019 |
| WO | 2015/185935 A1 | 12/2015 |
| WO | 2017/011628 A1 | 1/2017 |

OTHER PUBLICATIONS

International Search Report issued in corresponding International Patent Application No. PCT/JP2018/041491, dated Feb. 5, 2019, with English translation.
Extended European Search Report issued in corresponding European Patent Application No. 18903659.3-1210, dated Sep. 23, 2021.
Japanese Notice of Reasons for Refusal issued in corresponding Japanese Patent Application No. 2018-018125, dated Jan. 25, 2022, with English translation.

* cited by examiner

| TIME | UPSTREAM LIGHT SOURCE IL1 | DOWNSTREAM LIGHT SOURCE IL2 | PARTIAL IMAGES CAPTURED UNDER UPSTREAM LIGHTING | PARTIAL IMAGES CAPTURED UNDER DOWNSTREAM LIGHTING |
|---|---|---|---|---|
| T1 | ○ | × | Q0(IL1)=P0(IL1)+P1(IL1) | |
| T2 | × | ○ | | Q1(IL2)=P1(IL2)+P2(IL2) |
| T3 | ○ | × | Q2(IL1)=P2(IL1)+P3(IL1) | |
| T4 | × | ○ | | Q3(IL2)=P3(IL2)+P4(IL2) |
| T5 | ○ | × | Q4(IL1)=P4(IL1)+P5(IL1) | |
| T6 | × | ○ | | Q5(IL2)=P5(IL2)+P6(IL2) |

Fig. 7

| TIME | UPSTREAM LIGHT SOURCE IL1 | CENTRAL LIGHT SOURCE IL3 | DOWNSTREAM LIGHT SOURCE IL2 | PARTIAL IMAGES CAPTURED UNDER UPSTREAM LIGHTING | PARTIAL IMAGES CAPTURED UNDER CENTRAL LIGHTING | PARTIAL IMAGES CAPTURED UNDER DOWNSTREAM LIGHTING |
|---|---|---|---|---|---|---|
| T1 | ◯ | × | × | Q0(IL1)<br>=P0(IL1)+P1(IL1)+P2(IL1) | | |
| T2 | × | ◯ | × | | Q1(IL3)<br>=P1(IL3)+P2(IL3)+P3(IL3) | |
| T3 | × | × | ◯ | | | Q2(IL2)<br>=P2(IL2)+P3(IL2)+P4(IL2) |
| T4 | ◯ | × | × | Q3(IL1)<br>=P3(IL1)+P4(IL1)+P5(IL1) | | |
| ⋮ | ⋮ | ⋮ | ⋮ | ⋮ | ⋮ | ⋮ |

IMAGE ACQUISITION DEVICE, IMAGE ACQUISITION METHOD AND INSPECTION APPARATUS

CROSS REFERENCE

This application is the U.S. National Phase under 35 US.C. § 371 of International Application No. PCT/JP2018/041491, filed on Nov. 8, 2018, which claims the benefit of Japanese Application No. 2018-018125, filed on Feb. 5, 2018, the entire contents of each are hereby incorporated by reference.

TECHNICAL FIELD

This invention relates to an image acquisition technique for obtaining an image of an object (hereinafter, referred to as a "workpiece") for each light source in a state where the object is successively irradiated with light from N (N is a natural number equal to or greater than 2) light sources having mutually different irradiation directions and an inspection technique for inspecting a workpiece based on a plurality of images obtained by the image acquisition technique. Note that an "image of an object for each light source" means an image obtained by imaging the object in a state where the object is irradiated only with the light from each light source, and N object images are obtained in a device having N light sources.

The disclosure of Japanese Patent Application No. 2018-018125 filed on Feb. 5, 2018 including specification, drawings and claims is incorporated herein by reference in its entirety.

BACKGROUND ART

A device is known which inspects a workpiece based on a plurality of images obtained by imaging the three-dimensional workpiece such as a metal component, a resin component or a rubber component from various angles. For example, a plurality of light source units for respectively irradiating light to a workpiece held on a stage from a plurality of directions are provided in an inspection apparatus of patent literature 1. After the workpiece is positioned by rotating the stage by a predetermined angle, light is irradiated to illuminate the workpiece in a stationary state from the light source units and images of the workpiece are obtained by an imager. The workpiece is inspected based on a plurality of images obtained in this way.

CITATION LIST

Patent Literature

[Patent literature 1] JP 2016-57075A

SUMMARY OF INVENTION

Technical Problem

In the above conventional technique, each light source is switchingly turned on and off every time the workpiece is moved, illumination is changed by successively irradiating light to the workpiece in the stationary state from each of the plurality of light sources, and the image is obtained for each light source. By alternately performing a movement of the workpiece and an illumination change by switching the light sources in this way, images necessary for inspection are obtained. Thus, there is a limit to the shortening of a time required for image acquisition and the shortening of this time is desired. Further, such a request is not limited to workpiece inspection apparatus and a similar request is made, for example, for devices using a photometric stereo method. That is, in the photometric stereo method, an image of a workpiece is obtained for each light source in a state where light is successively irradiated to the workpiece from three or more light sources having mutually different irradiation directions and those captured images are combined. Thus, it is important in enhancing the operation efficiency of the device to obtain the image of the workpiece for each light source in a short time.

This invention was developed in view of the above problem and aims to shorten a time required to obtain an image of an object for each light source in a state where light is successively irradiated to the object from N (N is a natural number equal to or greater than 2) light sources having mutually different irradiation directions.

Solution to Problem

A first aspect of the invention is an image acquisition device that obtains images of an object for each light source in a state where the object is successively irradiated with light from N (N is an natural number equal to or greater than 2) light sources having mutually different irradiation directions. The device comprises: a mover that moves the object in a first direction; an imager having a strip-like imaging area extending in a second direction orthogonal to the first direction, the imager obtaining a partial image of the object by imaging a partial area of the object passing through the imaging area; a light source switch controller that successively switches the light to be irradiated to the object every time the object is moved in the first direction by a unit distance obtained by dividing a size of the imaging area in the first direction by the number N of the light sources; a storage that stories the partial images obtained by the imager every time the light is switched; and an object image acquisitor that obtains N images of the object by deleting a part of a composite image obtained by combining a plurality of the partial images stored in the storage for each light source according to a switching order of the light sources.

A second aspect of the invention is an image acquisition method that obtains images of an object for each light source in a state where the object is successively irradiated with light from N (N is an natural number equal to or greater than 2) light sources having mutually different irradiation directions while the object is moved in a first direction, the method comprises: preparing an imager having a strip-like imaging area extending in a second direction orthogonal to the first direction, the imager obtaining a partial image of the object by imaging a partial area of the object passing through the imaging area; successively switching the light to be irradiated to the object every time the object is moved in the first direction by a unit distance obtained by dividing a size of the imaging area in the first direction by the number N of the light sources and storing an image obtained by imaging the partial area by the imager as the partial image every time the light is switched; and forming a composite image by combining a plurality of the partial images stored in the storage for each light source and obtaining N images of the object by deleting parts of the composite images according to a switching order of the light sources.

A third aspect of the invention is an inspection apparatus that comprises: the image acquisition device; and an inspector for inspecting the object based on the N images of the object obtained by the image acquisition device.

In the invention thus configured, a movement of the object and the light source switch are performed in parallel and a plurality of partial images are obtained. An image of the object is obtained by deleting a part according to the switching order of the light sources from a composite image obtained by combining the plurality of partial images for each light source. As a result, as many images of the object illuminated only by one of the N light sources as the N light sources, i.e. N images of the object, are obtained. [Effect]

As described above, since the image of the object for each light source is obtained by performing the movement of the object and the light source switch in parallel, a time required for image acquisition for each light source can be shortened.

All of a plurality of constituent elements of each aspect of the invention described above are not essential and some of the plurality of constituent elements can be changed, deleted or replaced by new other constituent elements or limitation contents can be partially deleted as appropriate to solve some or all of the problems described above or achieve some or all of effects described in this specification. Further, some or all of technical features included in one aspect of the invention described above can be combined with some or all of technical features included in another aspect of the invention described above into one independent aspect of the invention to solve some or all of the problems described above or achieve some or all of effects described in this specification.

BRIEF DESCRIPTION OF DRAWINGS

FIG. 7 is a diagram schematically showing the operation of the image acquisition device.

EMBODIMENTS

Figure 1:
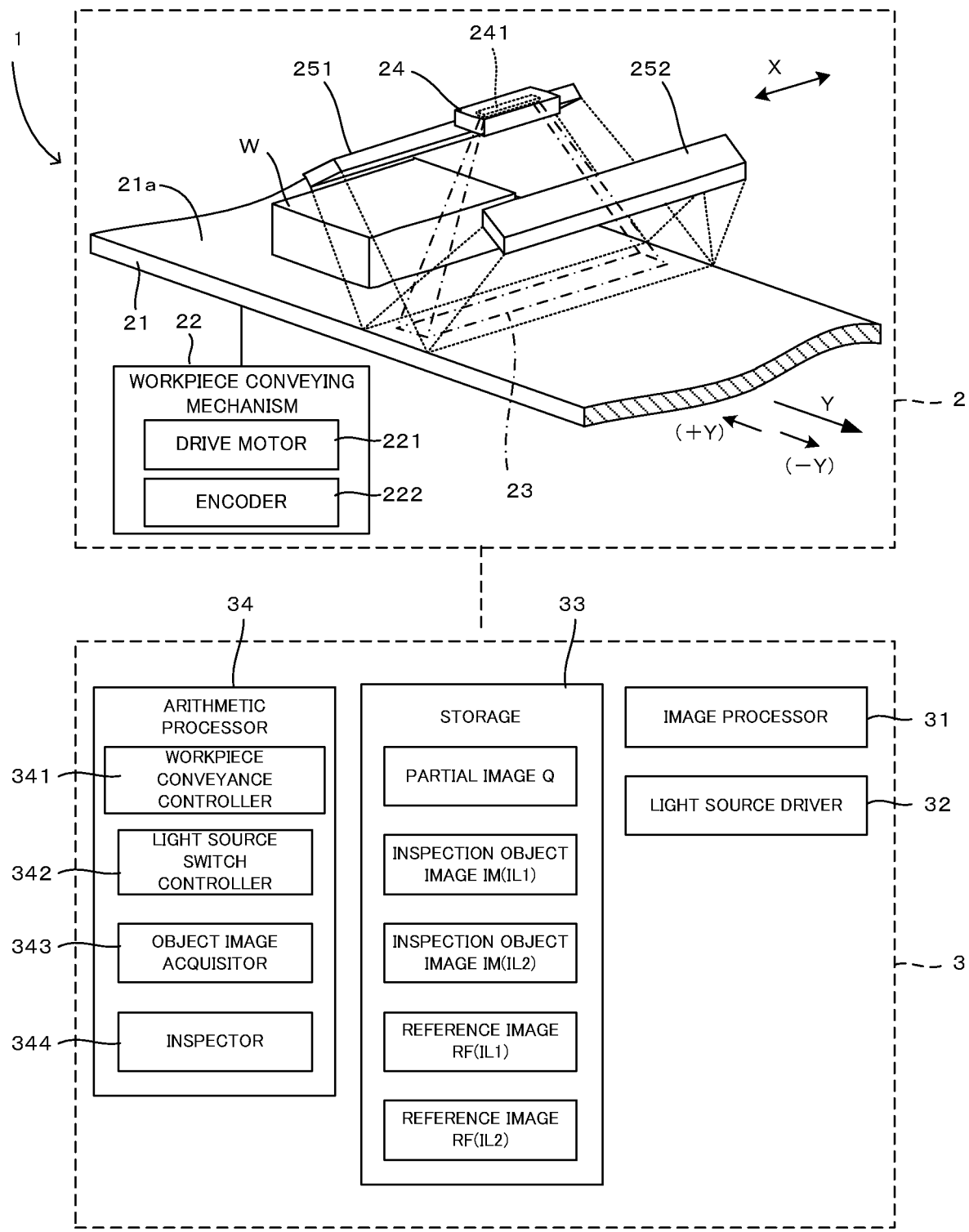
FIG. 1 is a diagram showing the configuration of an inspection apparatus equipped with a first embodiment of an image acquisition device according to the invention.
Figure 2:
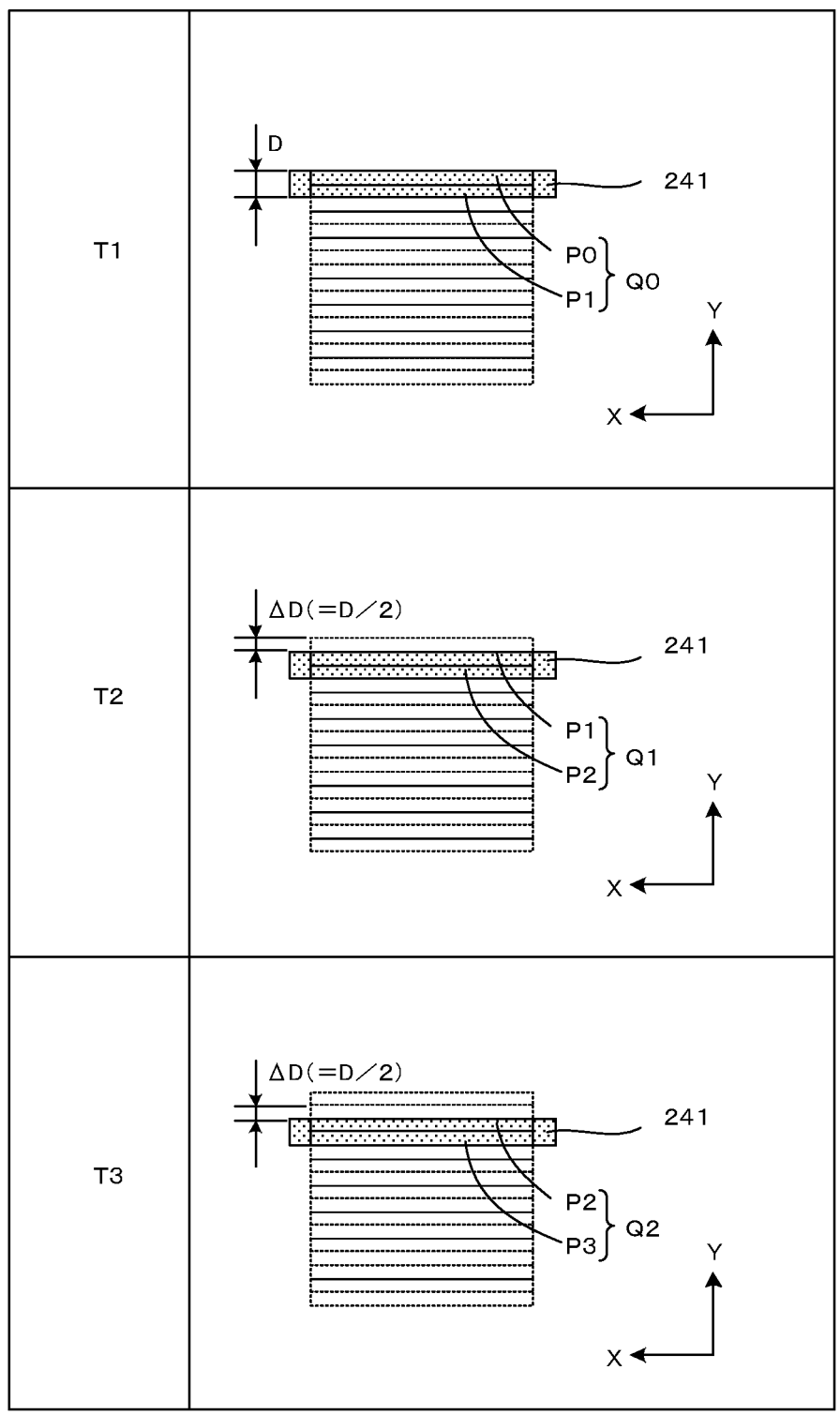
FIG. 2 is a schematic diagram showing a positional relationship of a workpiece and an imaging element in the inspection apparatus.
Figure 3:
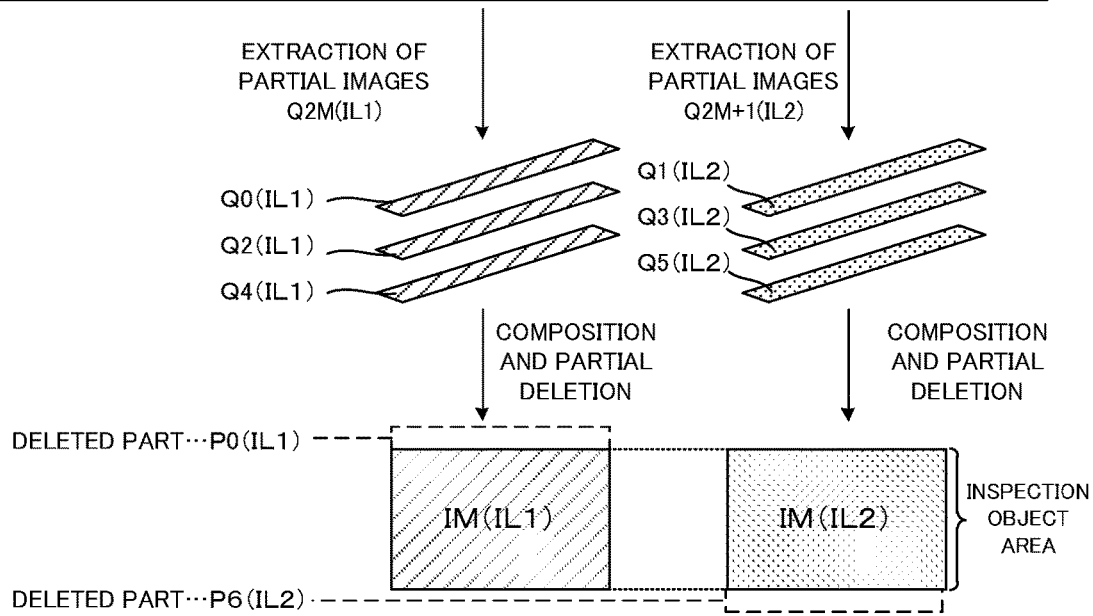
FIG. 3 is a diagram schematically showing the operation of the image acquisition device.
Figure 4:
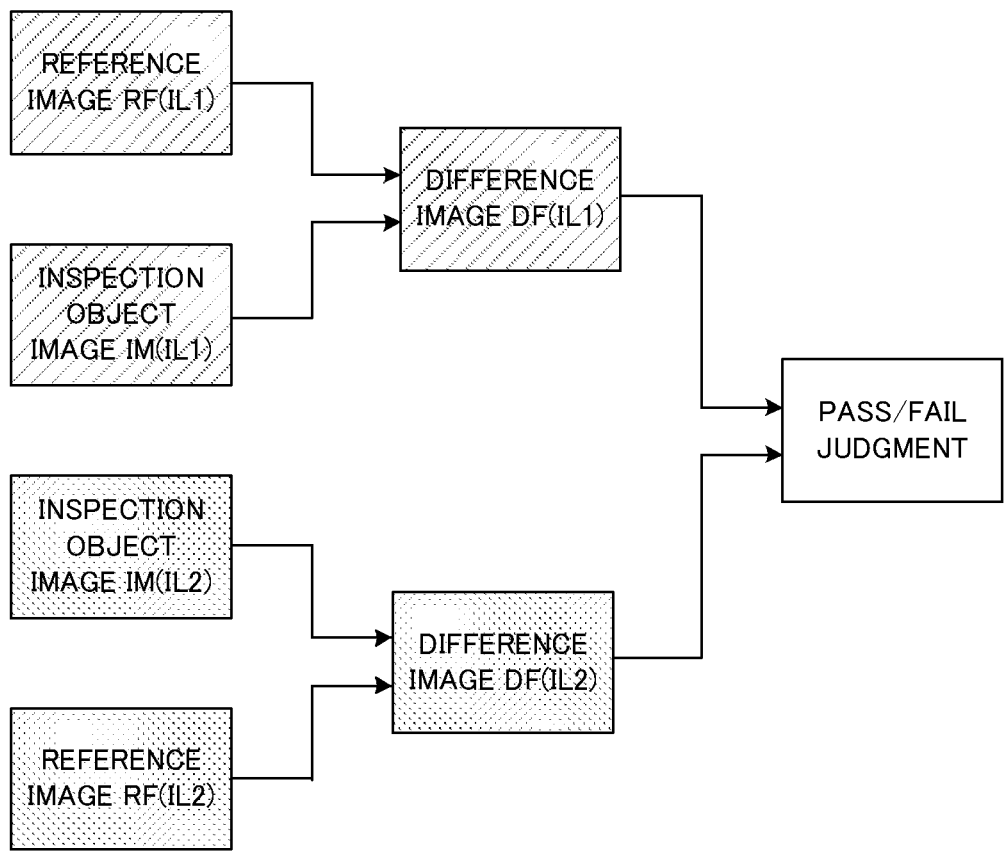
FIG. 4 is a diagram schematically showing an inspection operation in the inspection apparatus.

FIG. 1 is a diagram showing the configuration of an inspection apparatus equipped with a first embodiment of an image acquisition device according to the invention. FIG. 2 is a schematic diagram showing a positional relationship of a workpiece and an imaging element in the inspection apparatus. FIG. 3 is a diagram schematically showing the operation of the image acquisition device. FIG. 4 is a diagram schematically showing an inspection operation in the inspection apparatus. Note that a conveying direction of a workpiece W is referred to as a "sub-scanning direction Y", and a horizontal direction orthogonal to the sub-scanning direction Y is referred to as a "main scanning direction X".

The inspection apparatus 1 includes an image acquisition device to inspect a rectangular parallelepiped metal component formed, for example, by forging or casting as a workpiece W. The image acquisition device obtains an inspection object image IM(IL1) and an inspection object image IM(IL2) captured by illuminating the rectangular parallelepiped workpiece W respectively from an upstream side and a downstream side in the sub-scanning direction Y while moving the workpiece W in the sub-scanning direction Y. Further, the inspection apparatus 1 inspects the workpiece W by comparing the inspection object images IM(IL1) and IM(IL2) obtained by the image acquisition device with reference images RF(IL1), RF(IL2) obtained in advance.

As shown in FIG. 1, the inspection apparatus 1 includes a body 2 and a control unit 3 constituted by a computer. The body 2 includes a conveyor belt 21 for linearly moving the workpiece W in the sub-scanning direction Y. The conveyor belt 21 is stretched over two unillustrated rollers. A drive motor 221 of a workpiece conveying mechanism 22 is connected to one roller. An encoder 222 is coupled to this drive motor 221 and outputs a detection signal of the operation of the drive motor 221 to the control unit 3. If the drive motor 221 operates in response to a conveyance command from the control unit 3, the conveyor belt 21 is driven with the workpiece W placed on a belt upper surface 21a as shown in FIG. 1. In this way, the workpiece W is conveyed in the sub-scanning direction Y by way of an imaging area 23. Note that although the workpiece W is conveyed by the belt in this embodiment, a conveyance method of the workpiece W is not limited to this. For example, the workpiece W may be conveyed by a stage configured to reciprocally move along the sub-scanning direction Y.

An imager 24 and two light source units 251, 252 are fixedly arranged above the imaging area 23. The imager 24 is arranged at a position vertically above the imaging area 23 and can image the workpiece W passing through the imaging area 23 from above by an imaging element 241. The imaging element 241 is a line sensor in which a plurality of light receiving elements are arranged along the main scanning direction X, and has the strip-like imaging area 23 extending in the main scanning direction X as shown in FIG. 2.

In the light source unit 251, a plurality of LEDs (Light Emitting Diodes) are arranged into a bar extending in the main scanning direction X. Here, the light source unit 251 may be constituted by light sources of a type other than LEDs. This light source unit 251 functions as an upstream light source arranged upstream of and separated from the imager 24 in the sub-scanning direction Y and irradiates light toward the imaging area 23 obliquely from above on a side upstream of the imager 24. Thus, if only the light source unit 251 is turned on by a light source driver 32 of the control unit 3, light from the light source unit 251 is irradiated to the imaging area 23 and a partial area of the workpiece W located in the imaging area 23 and the periphery thereof are respectively illuminated by the light source unit 251. An image of the partial area illuminated in this way is captured. Note that, in this embodiment, partial images captured in a state where only light from the upstream light source (light source unit 251) is irradiated in this way are referred to as "partial images Q2m(IL1)". "2m" is a symbol for specifying the partial image and indicates 2×m. That is, the partial images Q2m means partial images Q0, Q2, Q4 and the like.

The other light source unit 252 is configured similarly to the light source unit 251, but is arranged at a position different from the light source unit 251 and has a light irradiation direction different from that of the light source unit 251. More particularly, the light source unit 252 is a downstream light source arranged downstream of and separated from the imager 24 in the sub-scanning direction Y and irradiates light toward the imaging area 23 obliquely from above on a side downstream of the imager 24. Thus, if only the light source unit 252 is turned on by the light source driver 32 of the control unit 3, light is irradiated to the imaging area 23 in the irradiation direction different from the one when the light source unit 251 is turned on, and a partial area of the workpiece W located in the imaging area 23 and the periphery thereof are respectively illuminated by the light source unit 252. An image of the partial area illuminated in this way is captured. Note that, in this embodiment, partial images captured in a state where only light from the downstream light source (light source unit 252) is irradiated in this way are referred to as "partial images Q2m+1 (IL2)". "2m+1" is a symbol for specifying the partial image and indicates 2×m+1. That is, the partial images Q2m+1 mean partial images Q1, Q3, Q5 and the like.

These two light source units 251, 252 are switchingly turned on and off by the operation of the light source driver 32 in response to a command from a light source switch controller 342 of the control unit 3. In this embodiment, the partial images Q2m(IL1), Q2m+1(IL2) are alternately captured in the following order every time the workpiece W moves in the sub-scanning direction Y by a unit distance ΔD obtained by dividing a size D of the imaging area 23 in the sub-scanning direction Y by the number "2" of the light sources as shown in FIG. 2, i.e. by successively switching the light to be irradiated to the workpiece W at times T1, T2 and the like. Here, if adjacent times, e.g. times T1 and T2 are focused, the following is found. The partial image Q0(IL1) is captured in a state where only light from the upstream light source (light source unit 251) is irradiated at time T1, and the Q1(IL2) is captured in a state where only light from the downstream light source (light source unit 252) is irradiated at time T2. These two partial images Q0(IL1), Q1(IL2) are obtained using different light sources, but include images P1(IL1), P1(IL2) obtained by imaging the same area of the workpiece W. Further, at the following times T2 and T3, similar images P2(IL2), P2(IL1) are included. The same also applies thereafter. Thus, if the partial images Q0, Q1, . . . are captured by the imager 24 every time the light source is switched while the light source switch performed in the order of the upstream light source and the downstream light source is repeated, Time T1: partial image Q0(IL1)=image P0(IL1)+ image P1(IL1)

Time T2: partial image Q1(IL2)=image P1(IL2)+ image P2(IL2)

Time T3: partial image Q2(IL1)=image P2(IL1)+ image P3(IL1)

Time T4: partial image Q3(IL2)=image P3(IL2)+ image P4(IL2)

are obtained as shown in FIG. 3 and a plurality of partial images Q0, Q1, . . . are stored in a storage 33 of the control unit 3.

Here, to facilitate the understanding of technical contents of this embodiment, a case where the light source switch of switching the light sources in the order of the upstream light source and the downstream light source as described above is repeated three times is described as an example. By performing a movement of the workpiece W and the light source switch in parallel in this way, the partial images Q0(IL1), Q1(IL2), Q2(IL1), Q3(IL2), Q4(IL1) and Q5(IL2) are obtained and stored in the storage 33. If the partial images Q0 to Q5 are extracted for each light source from the storage 33 and the extracted partial images are combined, two composite images can be obtained. By deleting a part of the partial image Q0(IL1) captured earliest, out of the composite image of the upstream light source turned on earlier, more specifically the image P0(IL1), an inspection object image IM(IL1) when the workpiece W was imaged in the state where only the light from the upstream light source (light source unit 251) was irradiated, i.e.

$$IM(IL1)=P1(IL1)+P2(IL1)+\ldots+P5(IL1),$$

is obtained. Further, by deleting a part of the partial image Q5(IL2) captured at last, out of the composite image of the downstream light source turned on later, more specifically the image P6(IL2), an inspection object image IM(IL2) when the workpiece W was imaged in the state where only the light from the downstream light source (light source unit 252) was irradiated, i.e.

$$IM(IL2)=P1(IL2)+P2(IL2)+\ldots+P5(IL2),$$

is obtained. The thus obtained inspection object images IM(IL1), IM(IL2) are stored in the storage 33.

The storage 33 is provided in the control unit 3 together with an image processor 31, the light source driver 32 and an arithmetic processor 34. As shown in FIG. 1, besides the partial images Q and the inspection object images IM(IL1), IM(IL2) described above, the storage 33 stores the reference images RF(IL1), RF(IL2), various programs and the like in advance. The reference image RF(IL1) is an image obtained when a good workpiece W is imaged in a state where only light from the upstream light source (light source unit 251) is irradiated, and the reference image RF(IL2) is an image obtained when the good workpiece W is imaged in a state where only light from the downstream light source (light source unit 252) is irradiated. Further, the programs stored in the storage 33 include an image acquisition program for obtaining the inspection object images IM(IL1), IM(IL2) and an inspection program for inspecting the workpiece W based on the inspection object images IM(IL1), IM(IL2). The arithmetic processor 34 performs various processes in accordance with these programs.

The arithmetic processor 34 is constituted by a CPU (Central Processing Unit) and obtains images and inspects the workpiece W by controlling each component of the apparatus in accordance with the above programs. That is, the arithmetic processor 34 functions as the workpiece conveyance controller 341 for controlling workpiece conveyance by controlling the workpiece conveying mechanism 22, the light source switch controller 342 for switchingly turning on and off the light source units 251, 252, an inspection object image acquisitor 343 for obtaining the inspection object images IM(IL1), IM(IL2) and an inspector 344 for inspecting the workpiece. In this embodiment, the arithmetic processor 34 obtains the inspection object images IM(IL1), IM(IL2) after obtaining a plurality of partial images by switching the light sources while moving the workpiece W in the sub-scanning direction Y in accordance with the image acquisition program. Further, the arithmetic processor 34 inspects the workpiece based on the inspection object images IM(IL1), IM(IL2). A workpiece inspection operation is described below with reference to FIG. 4 after an image acquisition operation is described with reference to FIGS. 1, 2 and 3.

If a workpiece W to be inspected is transferred to the conveyor belt 21, the arithmetic processor 34 drives the conveyor belt 21 to convey the workpiece W on the conveyor belt 21 in the sub-scanning direction Y as shown in FIG. 1 and performs the following imaging operation in parallel. In the imaging operation, only the light source unit 251 is turned on with the light source unit 252 turned off until a partial area located on the tip of the workpiece W (hereinafter, referred to as a "tip partial area") reaches the imaging area 23. Thereafter, at a timing (time T1) at which the tip partial area of the workpiece W arrives at the imaging area 23, an image (P0+P1) of the tip partial area of the workpiece W is focused on a light receiving surface of the imaging element 241 as shown in an upper field of FIG. 2. Thus, the imager 24 captures an image of the partial area located in the imaging area 23, i.e. the partial image Q0(IL1) (=P0(IL1)+P1(IL1)) in a state illuminated only with light from the light source unit 251, i.e. light source light IL1, and writes the captured image in the storage 33.

Subsequent to this, at a timing (time T2) at which the workpiece W is moved by the unit distance ΔD in the sub-scanning direction Y, the above image P0 deviates toward a (−Y) side from the light receiving surface (dotted area in FIG. 2) of the imaging element 241 and the image P2 is newly located on the light receiving surface of the imaging element 241 as shown in a middle field of FIG. 2. The light source unit 251 is turned off and the light source unit 252 is turned on in parallel with such a unit distance movement of the workpiece W. By this light source switch, the light source illuminating the imaging area 23 and the periphery thereof is switched from the light source unit 251 to the light source unit 252 at the timing (time T2). Accordingly, the imager 24 captures the partial image Q1(IL2) of a partial area located in the imaging area 23 in a state illuminated only with light from the light source unit 252, i.e. light source light IL2, and writes the captured image in the storage 33.

At a timing (time T3) at which the workpiece W is moved in the sub-scanning direction Y by one partial image area, the above image P1 deviates toward the (−Y) side from the light receiving surface of the imaging element 241 and the image P3 is newly located on the light receiving surface of the imaging element 241 as shown in a lower field of FIG. 2. The light source unit 252 is turned off and the light source unit 251 is turned on again in parallel with such a unit distance movement of the workpiece W. By this light source switch, the light source illuminating the imaging area 23 and the periphery thereof is switched from the light source unit 252 to the light source unit 253 at the timing (time T3). Accordingly, the imager 24 captures the partial image Q2(IL1) of a partial area located in the imaging area 23 in a state illuminated only with light from the light source unit 251, i.e. light source light IL1, and writes the captured image in the storage 33. Also thereafter, the movement of the workpiece W and the light source switch are performed in parallel in a manner similar to the above and, as shown in FIG. 3, the partial images are successively obtained at times T4 to T6:

Time T4: Q3(IL2)=image P3(IL2)+image P4(IL2)

Time T5: Q4(IL1)=image P4(IL1)+image P5(IL1)

Time T6: Q5(IL2)=image P5(IL2)+image P6(IL2), and written in the storage 33.

Subsequently, the arithmetic processor 34 extracts a plurality of the partial images Q obtained by the above imaging operation for each light source. Specifically, the partial images Q2$m$(IL1) are extracted in correspondence with the upstream light source, and the partial images Q2$m$+1(IL2) are extracted in correspondence with the downstream light source. Further, the arithmetic processor 34 deletes a part of the composite image obtained by combining the extracted partial images Q in accordance with the switching order of the light sources, obtains two inspection object images IM(IL1), IM(IL2) and writes the obtained images in the storage 33. In this way, the acquisition of the two two-dimensional images, i.e. the inspection object images IM(IL1), IM(IL2) for each light source is completed and the arithmetic processor 34 transitions to the inspection operation.

The arithmetic processor 34 performs the following inspection operation in accordance with the inspection program. Specifically, as shown in FIG. 4, the reference image RF(IL1) and the inspection object image IM(IL1) are read from the storage 33 and a difference between the both images is obtained. Similarly, the reference image RF(IL2) and the inspection object image IM(IL2) are read from the storage 33 and a difference between the both images is obtained. The arithmetic processor 34 determines whether or not there is any defect such as a scratch and a chip on a surface of the workpiece W based on difference images DF(IL1), DF(IL2) obtained in this way. Note that although pass/fail judgment of the workpiece W is made based on the difference images, a pass/fail judgment method is not limited to this. Another method for judgment based on the inspection object images IM(IL1), IM(IL2) may be used.

As described above, since the inspection object images IM(IL1), IM(IL2) are obtained by switching the light sources while moving the workpiece W in this embodiment, a time required for image acquisition can be drastically shortened.

Further, a plurality of partial images Q2$m$(IL1) captured by irradiating the light from the light source unit 251 and a plurality of partial images Q2$m$+1(IL2) captured by irradiating the light from the light source unit 252 are shifted by the unit distance ΔD. As described above, the inspection object images IM(IL1), IM(IL2) are formed by extracting the partial images Q for each light source, combining the extracted partial images Q and deleting partial images from the composite images. Thus, an inspection object image of an area of the workpiece W to be inspected can be accurately obtained.

Further, since the line sensor is used as the imaging element 241, the partial images obtained by imaging the imaging area 23 is transferred to the image processor 31 at a relatively high transfer rate. Thus, even if the workpiece W is moved at a relative high speed, the partial images Q2$m$(IL1), Q2$m$+1(IL2) can be reliably transferred.

Further, in this embodiment, two-dimensional images for each light source, i.e. the inspection object images IM(IL1), IM(IL2), are obtained by one imager 24 and the device configuration can be simplified as compared to the device described in patent literature 1 using a plurality of imagers.

Furthermore, since the inspection object images IM(IL1), IM(IL2) can be obtained in a short time, a time required for the inspection of the workpiece W can also be drastically shortened.

As just described, in this embodiment, the sub-scanning direction Y and the main scanning direction X respectively correspond to a "first direction" and a "second direction" of the invention, and the conveyor belt 21 and the workpiece conveying mechanism 22 provided to move the workpiece W in the sub-scanning direction Y function as a "mover" of the invention. Further, the light source units 251, 252 respectively function as a "first light source" and a "second light source" of the invention, but a turn-on order may be switched. In this case, the light source units 251, 252 respectively function as the "second light source" and the "first light source" of the invention. Further, a combination of the mover (=conveyor belt 21 and workpiece conveying mechanism 22), the two light source units 251, 252, the imager 24, the storage 33 and the arithmetic processor 34 including the light source switch controller 342 and the object image acquisitor 343 function as an "image acquisition device" of the invention. Further, since two light source units 251, 252 are provided and two two-dimensional images (=inspection object images IM(IL1), IM(IL2)) are obtained, N=2 in this embodiment.

Note that the invention is not limited to the above embodiment and various changes other than the aforementioned ones can be made without departing from the gist of the invention. For example, although the invention is applied to the inspection apparatus 1 for inspecting the workpiece W by obtaining the inspection object images IM(IL1), IM(IL2) using two light source units 251, 252 in the above embodiment, the invention can be applied also to an inspection apparatus including three or more light source units. An inspection apparatus including three light source units is described below with reference to FIGS. 5 to 8.

Figure 5:
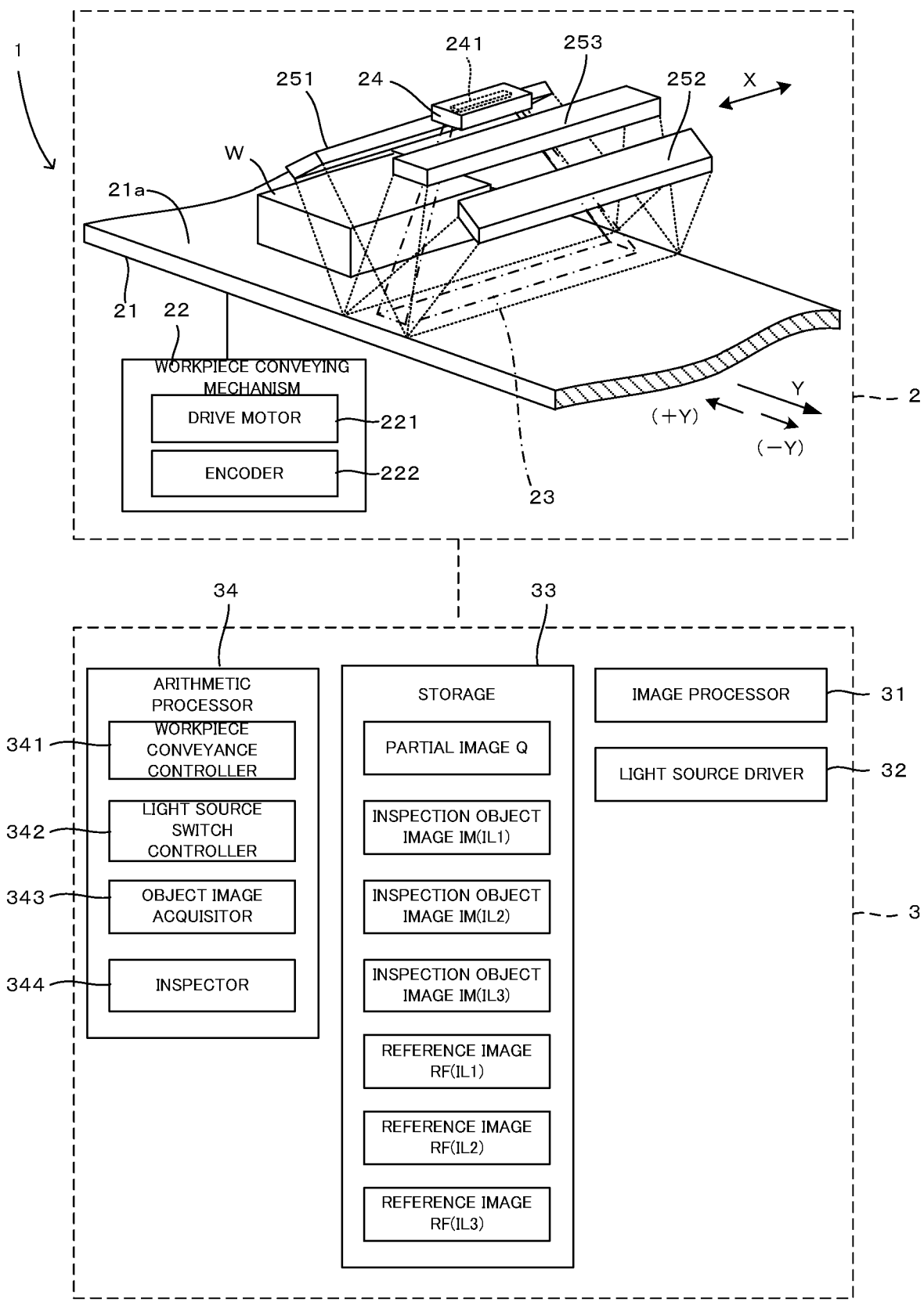
FIG. 5 is a diagram showing the configuration of an inspection apparatus equipped with a second embodiment of the image acquisition device according to the invention.
Figure 6:
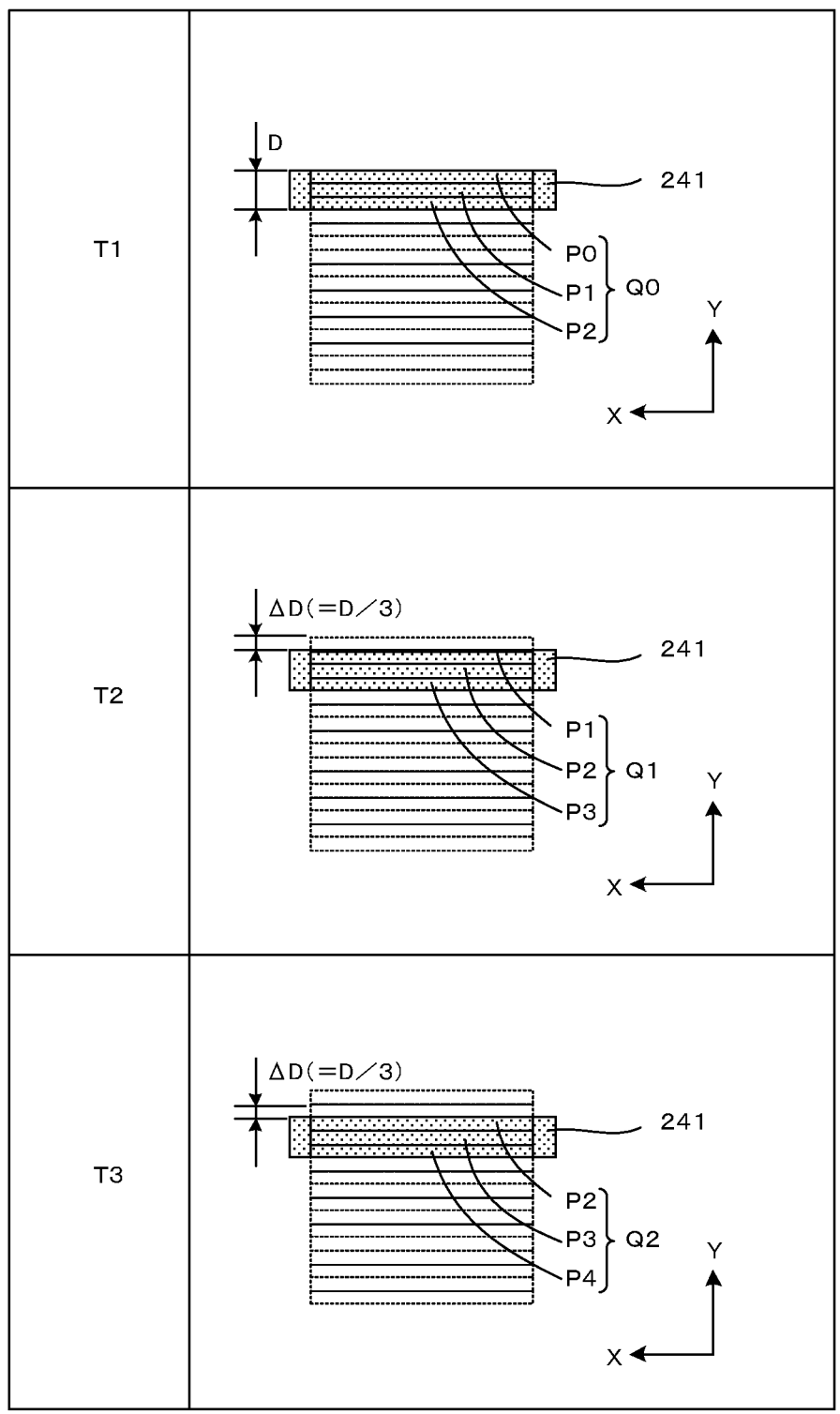
FIG. 6 is a schematic diagram showing a positional relationship of a workpiece and an imaging element in the inspection apparatus.
Figure 8:
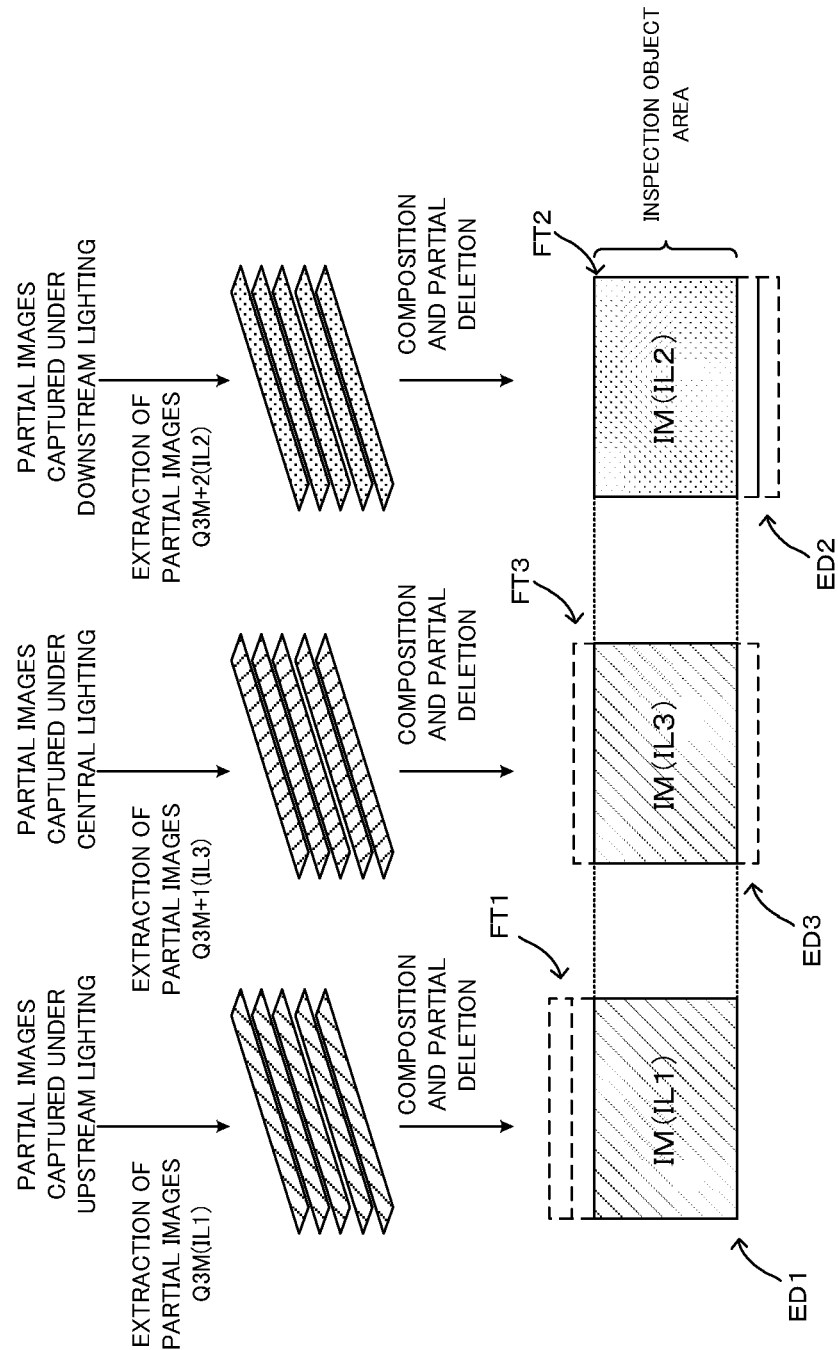
FIG. 8 is a diagram schematically showing the operation of the image acquisition device.

FIG. 5 is a diagram showing the configuration of an inspection apparatus equipped with a second embodiment of the image acquisition device according to the invention. FIG. 6 is a schematic diagram showing a positional relationship of a workpiece and an imaging element in the inspection apparatus. FIGS. 7 and 8 are diagrams schematically showing the operation of the image acquisition device. The second embodiment largely differs from the first embodiment in that another light source unit 253 is added besides light source units 251, 252 and N=3 and in that a unit distance ΔD is (D/3). Note that since the other configuration is basically the same, the same components are denoted by the same reference signs and not described.

In the second embodiment, as shown in FIG. 5, the light source unit 253 is provided downstream of and adjacent to an imager 24 in a sub-scanning direction Y. In the light source unit 253, a plurality of LEDs are arranged into a bar extending in a main scanning direction X, similarly to the light source units 251, 252. This light source unit 253 functions as a central light source for irradiating light toward an imaging area 23 substantially vertically from above at an intermediate position between the light source units 251, 252.

If a workpiece W to be inspected is transferred to a conveyor belt 21, an arithmetic processor 34 drives the conveyor belt 21 to convey the workpiece W on the conveyor belt 21 in the sub-scanning direction Y as shown in FIG. 5, and performs the following imaging operation.

In the second embodiment, as in the first embodiment, only the light source unit 251 is turned on with the light source units 252, 253 turned off until a tip partial area of the workpiece W reaches the imaging area 23. Thereafter, at a timing (time T1) at which the tip partial area of the workpiece W arrives at the imaging area 23, an image of the tip partial area of the workpiece W is focused on a light receiving surface of an imaging element 241 as shown in an upper field of FIG. 6. Thus, the imager 24 captures an image of the partial area located in the imaging area 23, i.e. a partial image Q0 (=P0(IL1)+P1(IL1)+P2(IL1)), in a state illuminated only with light from the light source unit 251, i.e. light source light IL1, and writes the captured image in a storage 33 (see FIG. 7).

Subsequent to this, the workpiece W is moved by the unit distance ΔD (=D/3) in the sub-scanning direction Y and the light source unit 251 is turned off and the light source unit 253 is turned on according to this movement. At this timing (time T2), the imager 24 captures a partial image Q1 (=P1(IL3)+P2(IL3)+P3(IL3)) of a partial area located in the imaging area 23 in a state illuminated only with light from the light source unit 253, i.e. light source light IL3, and writes the captured image in the storage 33.

The workpiece W is further moved by the unit distance ΔD in the sub-scanning direction Y and the light source unit 253 is turned off and the light source unit 252 is turned on according to this movement. At this timing (time T3), the imager 24 captures a partial image Q2 (=P2(IL2)+P3(IL2)+P4(IL2)) of a partial area located in the imaging area 23 in a state illuminated only with light from the light source unit 252, i.e. light source light IL2, and writes the captured image in the storage 33.

Also thereafter, the partial images Q are captured by the imager 24 every time the light source is switched while repeating the light source switch in an order of the upstream light source, the central light source and the downstream light source and, as shown in FIG. 7, the partial images Q are obtained and written in the storage 33 at times T4 and the like. The imaging operation is stopped after the light source switch described above is repeated a number of times set in advance.

Subsequently, the arithmetic processor 34 extracts a plurality of partial images obtained by the imaging operation for each light source as in the first embodiment. That is, the arithmetic processor 34 extracts the partial images Q3m (IL1) for the upstream light source, extracts the partial images Q3m+1 (IL3) for the central light source and extracts the partial images Q3m+2 (IL2) for the downstream light source. "3m" is a symbol for specifying the partial image and indicates 3×m. That is, the partial images Q3m means partial images Q0, Q3, Q6 and the like, the partial images Q3m+1 means partial images Q1, Q4, Q7 and the like, and the partial images Q3m+2 means partial images Q2, Q5, Q8 and the like.

Then, the arithmetic processor 34 obtains three inspection object images IM(IL1), IM(IL3) and IM(IL2) by deleting a part of a composite image obtained by combining the partial images extracted for each light source according to the light source switching order and writes the obtained images in the storage 33. An example of this operation is schematically shown in FIG. 8.

As shown in FIG. 8, the arithmetic processor 34 deletes a part of a partial image FT1 captured earliest, out of the composite image formed by the partial images Q3m(IL1) extracted for the upstream light source, more particularly images (parts indicated by broken line in FIG. 8) located on a downstream side (upper side in FIG. 8) out of images included in the partial image FT1. On the other hand, for the composite image formed by the partial images Q3+2(IL2) extracted for the downstream light source, a part of a partial image ED2 captured at last, contrary to the above case, more particularly images (parts indicated by broken line in FIG. 8) located on an upstream side (lower side in FIG. 8) out of images included in the partial image ED2, is deleted. Further, out of the composite image formed by the partial images Q3m+1(IL3) extracted for the central light source, a part of a partial image FT3 captured earliest, more particularly an image (part indicated by broken line in FIG. 8)

located on a downstream side out of images included in the partial image FT3, and a part of a partial image ED3 captured at last, more particularly an image (part indicated by broken line in FIG. 8) located on a upstream side out of images included in the partial image ED3, are deleted. Note that a partial image ED1 captured at last, out of the composite image formed by the partial images Q3$m$(IL1), and a partial image FT2 captured earliest, out of the composite image formed by the partial images Q3$m$+2 (IL2), are not deleted and included in an inspection object area.

After, the acquisition of three two-dimensional images, i.e. the inspection object images IM(IL1), IM(IL3) and IM(IL2) for each light source, is completed, the arithmetic processor 34 transitions to an inspection operation and inspects the workpiece W as in the first embodiment.

As just described, also in the second embodiment, since the inspection object images IM(IL1), IM(IL3) and IM(IL2) are obtained by switching the light sources (changing illumination) while moving the workpiece W as in the first embodiment, a time required for image acquisition can be drastically shortened. Note that three light source units 251, 252 and 253 are provided and respectively function as the "first light source", the "second light source" and a "third light source" of the invention in the second embodiment, but a turn-on order of the light sources is arbitrary without being limited to the turn-on order of the light source units 251, 253 and 252. Further, in the second embodiment, three two-dimensional images (=inspection object images IM(IL1), IM(IL3) and IM(IL2)) are obtained. That is, N=3 in this embodiment.

Further, although the inspection object images are obtained and the workpiece W is inspected while the workpiece W is linearly moved in the sub-scanning direction Y in the above embodiments, the application of the invention is not limited to this. For example, the invention can be applied also to an inspection apparatus for obtaining inspection object images and inspecting a workpiece W while rotating the workpiece W in a rotation direction R as shown in FIG. 9.

Figure 9:
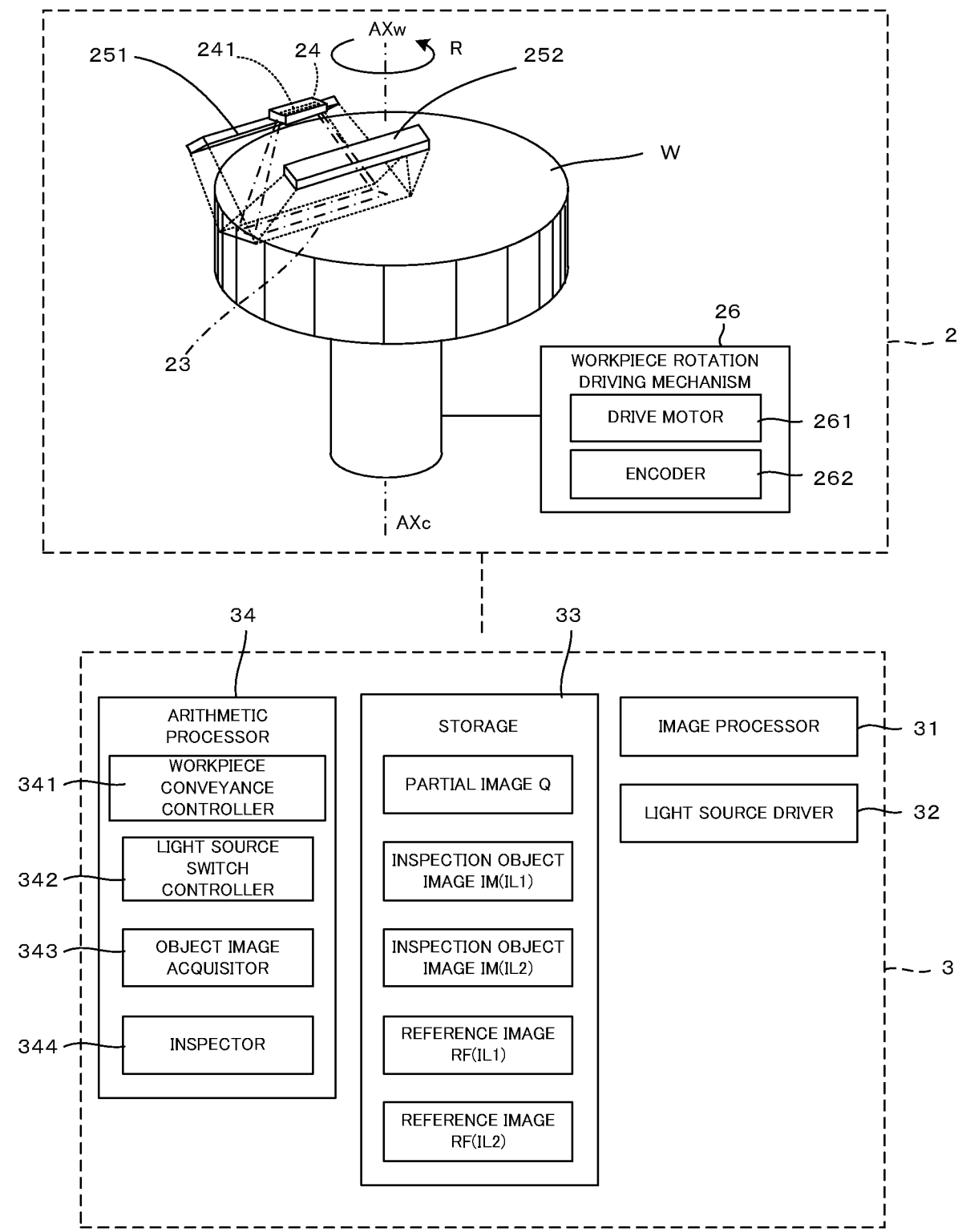
FIG. 9 is a diagram showing the configuration of an inspection apparatus equipped with a third embodiment of the image acquisition device according to the invention.

FIG. 9 is a diagram showing the configuration of an inspection apparatus equipped with a third embodiment of the image acquisition device according to the invention. The third embodiment largely differs from the first embodiment in that the workpiece W is a metal component having a rotationally symmetrical shape such as a gear and in that a moving direction of the workpiece W is changed from the sub-scanning direction Y to the rotation direction R. The other configuration is basically the same as in the first embodiment.

In this third embodiment, the workpiece W is held and rotationally moved by a workpiece rotation driving mechanism 26 as shown in FIG. 9. This workpiece rotation driving mechanism 26 includes an unillustrated chuck and holds the workpiece W with a rotation center axis AXc of the chuck and a rotational symmetry axis AXw of the workpiece W coincided. Further, the chuck is coupled to a drive motor 261 and rotates the workpiece W about the rotation center axis AXc by being rotated by the drive motor 261. In this embodiment, an encoder 262 is mounted on the drive motor 261 to detect the position of the workpiece W in the rotation direction R with high accuracy.

Further, an imager 24 and light source units 251, 252 are arranged vertically above the work W. As shown in FIG. 9, the imager 24 is provided to extend radially outward with respect to the rotational symmetry axis AXw of the workpiece W. Thus, an imaging area 23 of the workpiece W can be imaged by an imaging element 241 of the imager 24 while the workpiece W is rotated. Further, the light source units 251, 252 are respectively arranged upstream of and downstream of the imager 24 in the rotation direction R. In the light source unit 251, 252, a plurality of LEDs are arranged into a bar extending in a direction parallel to an extending direction of the imager 24. As in the first embodiment, if only the light source unit 251 is turned on by a light source driver 32 of a control unit 3, a partial area of the workpiece W located in the imaging area 23 and the periphery thereof are respectively illuminated by the light source unit 251 and a partial image is captured. Conversely, if only the light source unit 252 is turned on, a partial area of the workpiece W located in the imaging area 23 and the periphery thereof are respectively illuminated by the light source unit 252 and a partial image is captured.

Also in the third embodiment, as in the first embodiment, after partial images Q2$m$(IL1), Q2$m$+1(IL2) are obtained by switching the light sources in parallel with a rotational movement of the workpiece W, a plurality of partial images are extracted for each light source, and parts of composite images of those are deleted according to a switching order of the light sources to obtain inspection object images IM(IL1), IM(IL2). Subsequent to that, the inspection object images IM(IL1), IM(IL2) are respectively compared to reference images RF(IL1), RF(IL2) to perform pass/fail judgment for the workpiece W.

As just described, also in the third embodiment, the inspection object images IM(IL1), IM(IL2) are obtained by switching the light sources (changing illumination) while moving the workpiece W as in the first embodiment. Thus, a time required for image acquisition can be drastically shortened. Note that, in the third embodiment, the rotation direction R corresponds to the "first direction" of the invention, and a radial direction of the workpiece W corresponds to the "second direction" of the invention.

Further, although a forged component, a cast component or a metal component such as a gear serves as the workpiece W and the workpiece W is inspected by obtaining the inspection object image thereof for each light source in the above embodiments, the constituent material, the shape and the like of the workpiece W are not particularly limited. For example, a resin component or a rubber component may serve as the workpiece W and the invention may be applied to a device for obtaining inspection object images for inspection. Further, a component having a disk shape or a ring shape may serve as the workpiece W and the invention may be applied to a device for obtaining inspection object images for inspection.

Further, although the invention is applied to the inspection apparatus 1 for the workpiece W in the above embodiments, the image acquisition device and an image acquisition method according to the invention may be applied to a device for forming a composite image by a photometric stereo method. However, to use the photometric stereo method, it is necessary to provide three or more light source units and obtain three or more two-dimensional images.

Although the invention has been described by way of the specific embodiment above, this description is not intended to be interpreted in a limited sense. Similar to other embodiments of the invention, various modifications of the disclosed embodiment will become more apparent to a person skilled in this art by referring to the description of the invention. Therefore, appended claims are construed to include these modifications or embodiments without departing from the true scope of the invention.

INDUSTRIAL APPLICABILITY

This invention can be applied to an image acquisition technique for obtaining images of an object for each light source in a state where the object is successively irradiated with light from N (N is a natural number equal to or greater than 2) light sources having mutually different irradiation directions and devices in general equipped with this technique.

REFERENCE SIGNS LIST 1 inspection apparatus
21 conveyor belt (mover)
22 work conveying mechanism (mover)
23 imaging area
24 imager
26 work rotation driving mechanism (mover)
33 storage
34 arithmetic processor
241 imaging element
251, 252, 253 light source unit
342 light source switch controller
343 object image acquisitor
344 inspector
ED1-ED3 partial image (captured at last)
FT1-FT3 partial image (captured earliest)
IL1, IL2, IL3 light source light
IM inspection object image (two-dimensional image)
Q, Q2m, Q2m+1, Q3m, Q3m+1, Q3m+2 partial images
R rotation direction (first direction)
W workpiece (object)
X main scanning direction (second direction)
Y sub-scanning direction (first direction)
ΔD unit distance

The invention claimed is:

1. An image acquisition device for obtaining images of an object, comprising:
two or more light sources, wherein each light source is configured in a state that the object is successively irradiated with light from the two or more light sources at mutually different irradiation directions;
a mover configured to move the object in a first direction;
an imager comprising a single imaging element having a strip-like imaging area extending in a second direction orthogonal to the first direction, wherein the imager is configured to obtain a partial image of the object by imaging a partial area of the object passing through the strip-like imaging area of the imaging element;
a light source switch controller that is configured to successively switch the light to irradiate the object every time the object is moved in the first direction by a unit distance obtained by dividing a size of the strip-like imaging area of the imaging element in the first direction by a number of the two or more light sources;
a storage configured to store the partial images obtained by the imager every time the light is switched; and
an object image acquisitor configured to obtain two or more images of the object by deleting a part of a composite image obtained by combining a plurality of the partial images stored in the storage for each light source according to a switching order of the light sources,
wherein the two or more light sources include a first light source and a second light source,
wherein the light source switch controller is configured to switch the first and second light sources to repeat an operation of turning on the light sources in an order of the first light source and the second light source a plurality of times, and
wherein the object image acquisitor is configured to obtain:
a first image of the object when light only from the first light source is irradiated to the object by deleting a part of the partial image captured earliest, out of the composite image obtained by combining the partial images obtained while the first light source is on; and
a second image of the object when light only from the second light source is irradiated to the object by deleting a part of the partial image captured at last, out of the composite image obtained by combining the partial images obtained while the second light source is on.

2. An image acquisition device for obtaining images of an object, comprising:
two or more light sources, wherein each light source is configured in a state that the object is successively irradiated with light from the two or more light sources at mutually different irradiation directions;
a mover configured to move the object in a first direction;
an imager comprising a single imaging element having a strip-like imaging area extending in a second direction orthogonal to the first direction, wherein the imager is configured to obtain a partial image of the object by imaging a partial area of the object passing through the strip-like imaging area of the imaging element;
a light source switch controller that is configured to successively switch the light to irradiate the object every time the object is moved in the first direction by a unit distance obtained by dividing a size of the strip-like imaging area of the imaging element in the first direction by a number of the two or more light sources;
a storage configured to store the partial images obtained by the imager every time the light is switched; and
an object image acquisitor configured to obtain two or more images of the object by deleting a part of a composite image obtained by combining a plurality of the partial images stored in the storage for each light source according to a switching order of the light sources,
wherein the two or more light sources include a first light source, a second light source and a third light source,
wherein the light source switch controller is configured to switch the first, the second, and the third light sources to repeat an operation of turning on the light sources in an order of the first light source, the third light source and the second light source a plurality of times, and
wherein the object image acquisitor is configured to obtain:
a first image of the object when light only from the first light source is irradiated to the object by deleting a part of the partial image captured earliest, out of the composite image obtained by combining the partial images obtained while the first light source is on;
a second image of the object when light only from the second light source is irradiated to the object by deleting a part of the partial image captured at last, out of the composite image obtained by combining the partial images obtained while the second light source is on; and
a third image of the object when light only from the third light source is irradiated to the object by deleting both a part of the partial image captured earliest and a part of the partial image captured at last, out of the composite image obtained by combining the partial images obtained while the third light source is on.

3. The image acquisition device according to claim 1, wherein:
the mover is configured to linearly move the object in the first direction.

4. The image acquisition device according to claim 1, wherein:
the mover is configured to rotationally moves the object in the first direction.

5. An image acquisition method for determining images of an object using two or more light sources, comprising:
configuring each light source in a state that the object is successively irradiated with light from the two or more light sources at mutually different irradiation directions;
moving the object in a first direction;
configuring an imager comprising a single imaging element having a strip-like imaging area extending in a second direction orthogonal to the first direction, the imager obtaining a partial image of the object by imaging a partial area of the object passing through the strip-like imaging area of the imaging element;
successively switching the two or more light sources to irradiate the object every time the object is moved in the first direction by a unit distance obtained by dividing a size of the strip-like imaging area of the imaging element in the first direction by a number of the two or more light sources;
storing an image obtained by imaging the partial area by the imager as the partial image every time the light is switched; and
forming composite images by combining the stored partial images, wherein for each light source an image is formed by combining the partial images corresponding to the light source, and wherein parts of the composite images are deleted based on a number of the two or more light sources and according to a switching order of the two or more light sources
wherein the two or more light sources include a first light source and a second light source,
wherein the successively switching includes switching the first and second light sources to repeat an operation of turning on the light sources in an order of the first light source and the second light source a plurality of times, and
wherein the forming composite images includes obtaining
a first image of the object when light only from the first light source is irradiated to the object by deleting a part of the partial image captured earliest, out of the composite image obtained by combining the partial images obtained while the first light source is on; and
a second image of the object when light only from the second light source is irradiated to the object by deleting a part of the partial image captured at last, out of the composite image obtained by combining the partial images obtained while the second light source is on.

6. An inspection apparatus, comprising:
the image acquisition device according to claim 1; and
an inspector for inspecting the object based on the images of the object obtained by the image acquisition device.

7. The image acquisition device of claim 1, wherein the single imaging element is a linear sensor extending in the second direction.

8. The image acquisition device of claim 1, wherein the imager is further configured to capture a single partial image each time the light is switched.

9. The image acquisition device of claim 1, wherein when forming the images of the object from the composite images, the object image acquisitor is further configured to delete, in the composite image, a part of the partial image captured earliest, a part of the partial image captured last, or parts of the partial images captured earliest and last.

* * * * *